United States Patent [19]
Mayer

[11] 3,860,030
[45] Jan. 14, 1975

[54] PLURAL-HEADER BLENDING SYSTEM
[75] Inventor: Robert Mayer, Ardmore, Pa.
[73] Assignee: Sun Oil Company, Philadelphia, Pa.
[22] Filed: Dec. 7, 1973
[21] Appl. No.: 422,801

[52] U.S. Cl. .................... 137/563, 137/88, 137/594
[51] Int. Cl. .......................................... G05d 11/13
[58] Field of Search ............ 137/88, 563, 594, 605, 137/606

[56] References Cited
UNITED STATES PATENTS
3,385,680  5/1968  Feld et al. ......................... 137/88 X
3,784,169  1/1974  Bockmann ...................... 137/563 X

*Primary Examiner*—Robert G. Nilson
*Attorney, Agent, or Firm*—George L. Church; Donald R. Johnson; Frank A. Rechif

[57] ABSTRACT

A stream-type liquid blending system utilizes a number of flow loops, one for each of the components which it may be desired to blend; the flow loops are each capable of being connected (by way of remotely-controlled block valves) into either one or the other of two blending headers. Each flow loop has associated therewith percent switches which are manually set to establish (by operation of the block valves) to which header a given flow loop is connected, and also to set the percentage of the given component in the blend. The blend flowrate and the preset quantity of a blend can be set individually for each header. An air blowing system functions at the end of a blending operation to force the remaining blended liquid out of the header, and a blowback system associated with each loop blows most of the liquid component in such loop back toward the tank wherein it is stored.

10 Claims, 5 Drawing Figures

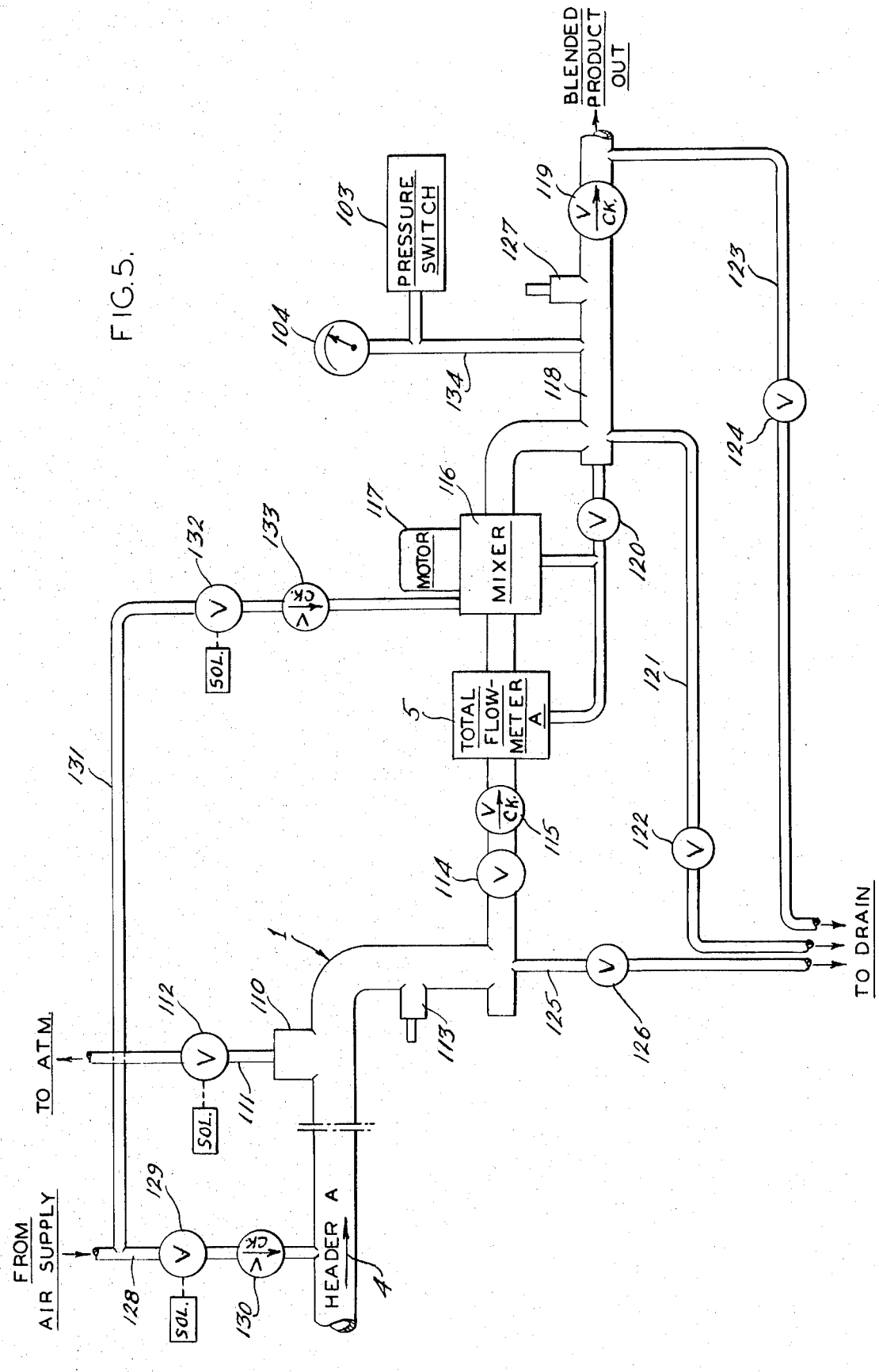

PLURAL-HEADER BLENDING SYSTEM

This invention relates to a stream-type blending system for liquids, and more particularly to a blending system (i.e., a blender) for controlling two blending headers, whereby it is possible to carry out two blending operations simultaneously, using a single blender.

With two such blenders, it would thus be possible to carry out four blending operations at one time.

As a part of the normal operations in a petroleum refinery, it is necessary to carry out blending operations to produce various final products. For example, base oils, additives, and dyes may be blended together to produce a blended oil product. For stream-type blenders which carry out such blending operations automatically, flow loops may be used for the various materials (blending components). Each such flow loop comprises a pump the discharge of which goes through a control valve (which is controlled automatically by the blender) and then through a stream flowmeter to a blending manifold or header; a bypass valve provides an alternative liquid flow path from the outlet side of the flowmeter back to the pump suction or inlet. The blending components are supplied to the individual flow loops by means of hoses leading from the tanks containing such components to the suction sides of the respective pumps. Thus, it is possible to choose from a larger number of base oils and additives for any given blend. By way of example, Blender No. 1 (of two) may control 13 flow loops: four rated at 300 gpm (gallons per minute), four rated at 120 gpm, one at 60 gpm, two at 6 gpm, and two dye loops at 1.5 gpm. Blender No. 1 will be described hereinafter, in detail. Blender No. 2 may control nine flow loops: three rated at 300 gpm, four at 120 gpm, and two at 6 gpm. In a typical installation in a petroleum refinery, there might be two blenders (contained in the same cabinet, but completely independent of each other).

In Blender No. 1, neglecting the two dye loops, there would be eleven flow loops for active or functional blending components. According to this invention, Blender No. 1 has two blending headers, and any given one of these 11 loops (actually, any one of the total of 13 loops) may be connected to either of the two headers (but not to both headers simultaneously). Thus, two blending operations may be carried out simultaneously (one in each header), using any combination of components (including the two dyes) totaling 13 in number (or totaling some lesser number, of course). This arrangement provides a wide degree of flexibility for blending. The connection of the flow loops to either of the two headers may be carried out by selective actuation of two remotely-controlled, electrically-operated block valves, which respectively couple the outlet side of the stream flowmeter (in the flow loop) to the two headers.

Similarly, Blender No. 2 has two blending headers, and any given one of the nine flow loops controlled by this blender may be connected to either of these two latter headers (but not to both such headers simultaneously). Thus, two more blending operations may be carried out simultaneously (one in each header of Blender No. 2), using any combination of components totaling nine in number (or totaling some lesser number, of course). Using both Blender No. 1 and Blender No. 2, it is possible to carry out four blending operations at one time, using as many as 20 flow loops (say, 20 components) in the four blends, plus the two dye (low-flow-rate) loops.

An object of this invention is to provide a novel stream-type liquid blending system.

Another object is to provide a stream-type blending system having improved flexibility of operation.

A further object is to provide a blending system wherein any given blending component (of a rather large number of blending components) may be connected selectively to one or the other of two blending headers.

A still further object is to provide, in an automatic blending system employing a separate control valve for each blending component, an arrangement which operates to reduce the total (blend) flow rate upon the opening of any of the component control valves beyond a certain percentage of its maximum opening.

Still another object is to provide, in an automatic blending system of the stream type, an arrangement for forcing blended liquid out of the blending header upon the completion of a blending operation.

Yet another object is to provide, in a blending system wherein a flow loop is utilized for each blending component, an arrangement for purging the blending component from each flow loop upon the completion of a blending operation.

A detailed description of the invention follows, taken in conjunction with the accompanying drawings, wherein:

FIG. 5 is a block diagram illustrating a so-called mixer section used in the system of the invention.

Figure 1:
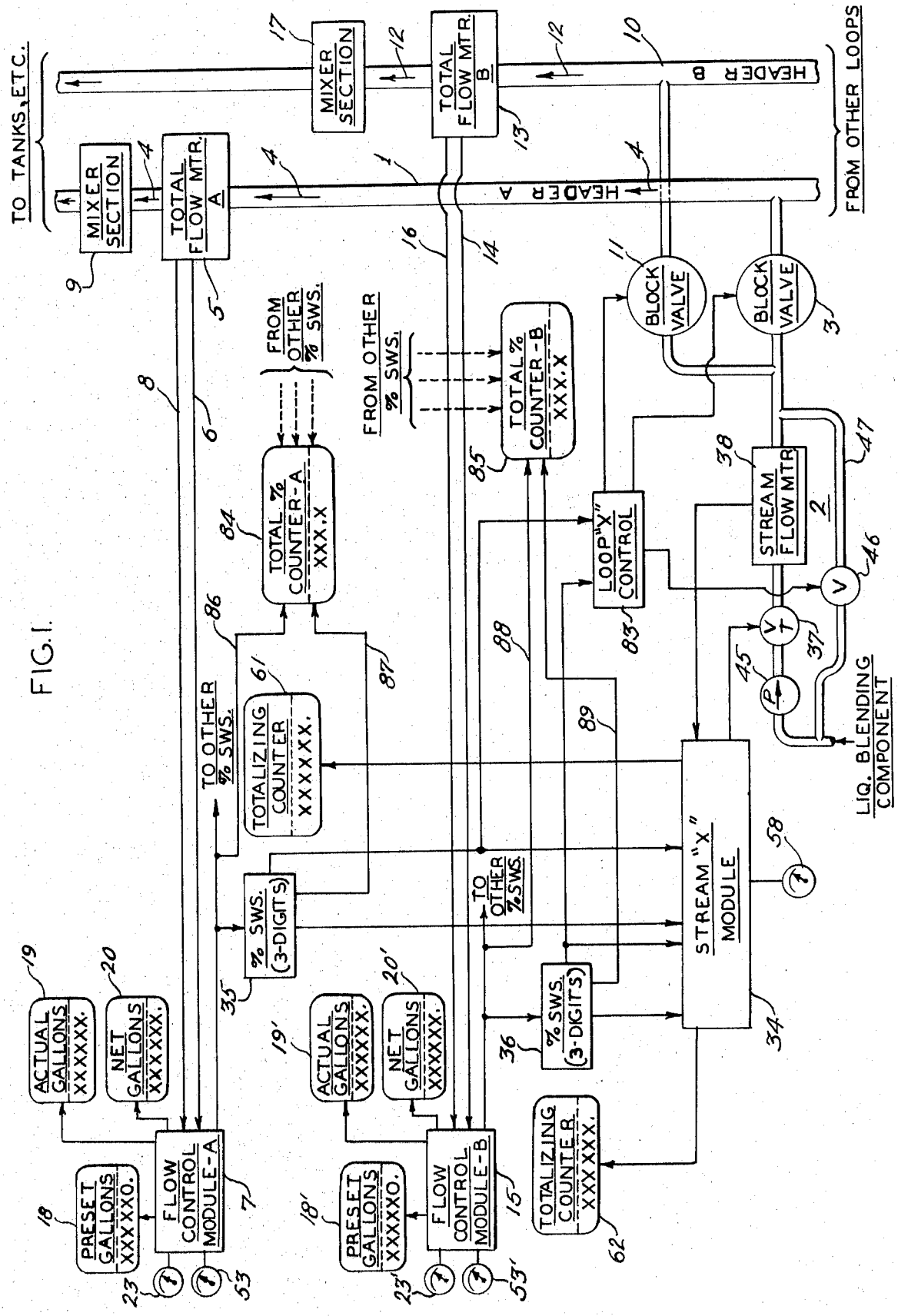
FIG. 1 is a block diagram illustrating the interrelationships between representative components of a plural-header blending system according to this invention.

Referring first to FIG. 1, this figure illustrates representative components of a plural-header blending system, such as Blender No. 1, previously referred to. Two headers A and B are disclosed, header A utilizing a manifold pipe 1 to which various selected flow loops such as the flow loop 2 (schematically illustrated as typical) may be connected, as by way of block valve 3, in order to provide a blend of liquids in the header. Each flow loop such as 2 (loop 2 being the final one for header A, the flow of blended liquid being in the direction of the arrows 4) may supply a respective liquid blending component (which is generally a base oil, or an additive) to the manifold 1.

A "total flowmeter 5 is coupled into the manifold pipe 1 at a point downstream of all the flow loop connections to this manifold. This flowmeter measures the total flow of blended product through the manifold 1. Flowmeter 5 is of more or less conventional type, having an uncompensated portion (which measures the "actual" quantitative flow, at pumping temperature, of the blended product in manifold 1, and produces proportionate electrical pulses at the rate of 10 pulses per gallon of actual flow) and also a temperature-compensated portion (which in effect converts the actual flow of the blended product in manifold 1 to a "net" flow, at 60°F., and produces proportionate electrical pulses at the rate of 10 pulses per gallon of this net flow). The actual pulses from flowmeter 5 are fed by way of a lead 6 to a flow control module 7 (later described in more detail) for header A, while the net pulses from flowmeter 5 are fed by way of a lead 8 to flow control module 7.

After passing through the flowmeter 5, the blended liquid flowing in manifold 1 passes into and through a mixer section 9 (hereinafter described in more detail), and thence on into suitable storage and/or distribution facilities such as tanks, etc.

Header B utilizes a manifold pipe 10 to which various selected flow loops such as the flow loop 2 may be connected, as by way of block valve 11, in order to provide a blend of liquids in this last-mentioned header. Each flow loop such as 2 (the flow of blended liquid in header B being in the direction of the arrows 12) may supply a respective liquid blending component to the manifold 10.

The total flowmeter 13 (preferably exactly similar to flowmeter 5) measures the total flow of blended product through the pipe 10. The actual pulses from flowmeter 13 are fed by way of a lead 14 to a flow control module 15 for header B, while the net (i.e., temperature-compensated) pulses from flowmeter 13 are fed by way of a lead 16 to flow control module 15. The flow control module 15 may be quite similar to module 7.

After passing through the flowmeter 13, the blended liquid flowing in manifold 10 passes into and through a mixer section 17 (similar to mixer section 9), and thence on into suitable storage and/or distribution facilities such as tanks, etc.

Figure 2:
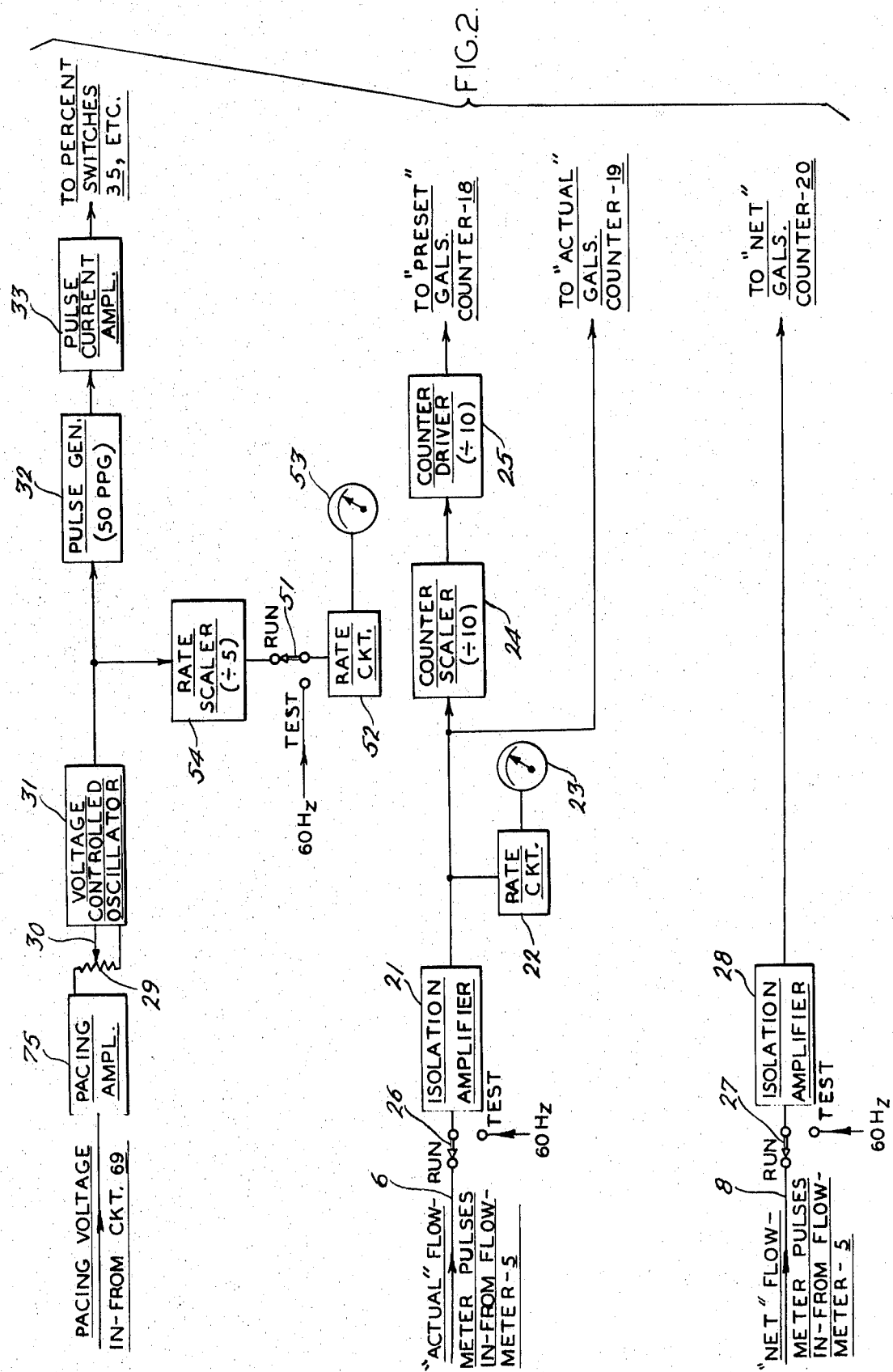
FIG. 2 is a block diagram illustrating a flow control module utilized in the system of the invention.

There are two flow control modules 7 and 15 associated with each blender, as illustrated in FIG. 1; module 7 is connected to header A and module 15 is connected to header B. These two flow control modules are exactly similar; FIG. 2 is a block diagram of flow control module 7. There are three counters (such as 18, 19, and 20 for total flowmeter 5) associated with each total flowmeter. The first of these is the preset counter 18 (a predetermining electrical counter, settable manually but counting and being reset electrically), which is arranged in a more or less conventional fashion to shut off the blend after a preset number of gallons has passed through the total flowmeter 5. The manual setting of counter 18 for header A and of counter 18' for header B provides for presetting the quantity of blend individually for each header of each blender. The non-compensated actual flowmeter pulses appearing on lead 6 are fed (when switch 26 is in the "run" position illustrated) through an isolation amplifier 21 to a rate circuit 22 to show on a meter 23 (reading in gallons per minute) the actual flow rate of the liquid being blended. The pulse output of amplifier 21 is also fed through a counter scaler 24, which divides the flowmeter signals by ten, and then through a counter driver 25, which again divides by ten, to the preset counter 18. The preset counter 18 thus advances one count for every ten gallons of flow through the total flowmeter 5 (again assuming that this flowmeter produces ten pulses per gallon of liquid flowing therethrough). The preset counter turns off the blend and also disconnects itself from the circuit when it reaches a count of zero.

As previously stated, the preset counter 18 counts down to zero. However, it preferably includes a "precontact" (set at 20 or 200 gallons) which operates in the following manner. When the count on counter 18 reaches this point (20 or 200 gallons), the blend flow rate is reduced to approximately one-third of the set rate, and any dye streams which may be operating are cut off. This action prevents too much splashing when filling a truck or a tank car, and also washes any dye out of the lines.

The output of isolation amplifier 21 also goes to the second (19) of the three counters mentioned, counter 19 being an electronic counter which contains a division-by-10 circuit, so that it advances one count for each gallon through the total flowmeter 5. Thus, this actual counter 19 totalizes all the material which goes through the total flowmeter 5. The material which goes through the total flowmeter during the blowback operation at the end of the blend (i.e., the material which is then blown out of the manifold 1) is not registered on counter 18, but is registered on the electronic counter 19.

The third of the three counters previously mentioned is a net counter 20, which is driven from the temperature-compensated portion of the total flowmeter 5. When switch 27 is in the run position illustrated, the compensated net flowmeter pulses appearing on lead 8 are supplied to the input of an isolation amplifier 28, and the output of this amplifier goes directly to the electronic counter 20 which also advances one count for each gallon through the total flowmeter 5. However, the number of gallons registered on counter 20 is the amount which has been metered by the total flowmeter 5 and corrected to the volume at 60°F.

Flow control module 15 and total flowmeter 13 have associated therewith three counters exactly similar respectively to the counters 18, 19, and 20 previously described, the counters associated with the units 13, 15 being denoted by the same reference numerals but carrying prime designations.

The voltage for controlling a voltage-controlled oscillator 31 in the flow control module 7 (FIG. 2) is obtained from a set flow potentiometer 29 with which is operatively associated a knob control 30. Under normal operation of the blender, a five-volt signal is provided (as will be further described hereinafter) for the potentiometer 29. The frequency of the output of the oscillator 31 is controlled by the "set flow" knob of control 30.

A pulse generator 32 is connected to the output of oscillator 31, to convert such output into pulses for controlling the flow rate of the corresponding header, which in the case being described (since flow control module 7 is associated with header A) would be header A. A pulse current amplifier 33 is connected to amplify the current output of pulse generator 32, so that the pulse generator 32 can drive the necessary number of percent switches.

The pulse generator arrangement 32, 33 is connected to percent switches (each three digits, arranged in decade fashion) and drives each decade thereof in the normal 1-2-4-8 binary coded decimal (BCD) configuration. There are two percent switches associated with each stream module and flow loop. One switch of each such pair of percent switches is driven by the pulse generator arrangement 32, 33 in the flow control module 7, and the other switch of each such pair is driven by the very similar pulse generator arrangement in the flow control module 15. FIG. 1 shows one stream module 34 (which is the one corresponding to Stream "X") and its associated flow loop 2 (which, again, corresponds to Stream X). FIG. 1 shows the two percent switches 35 and 36 which are associated with stream module 34 and flow loop 2, the percent switch 35 being driven by the pulse generator arrangement 32, 33 in flow control module 7 and the percent switch 36 being driven by the similar pulse generator arrangement in flow control module 15.

The determination of which flow control module (7 or 15) will control the blend, as well as the determination of which header (A or B) a given flow loop such as 2 is connected to, is made by setting one percent switch (35, or 36) to its desired percentage, while the other percent switch associated with the corresponding stream module should be set to zero. Assume, for purposes of discussion, that percent switch 35 has been set to a desired percentage, and percent switch 36 has been set to zero. Then, flow control module 7 will control the blend, and flow loop 2 is connected to header A (pipe 1).

Figure 3:
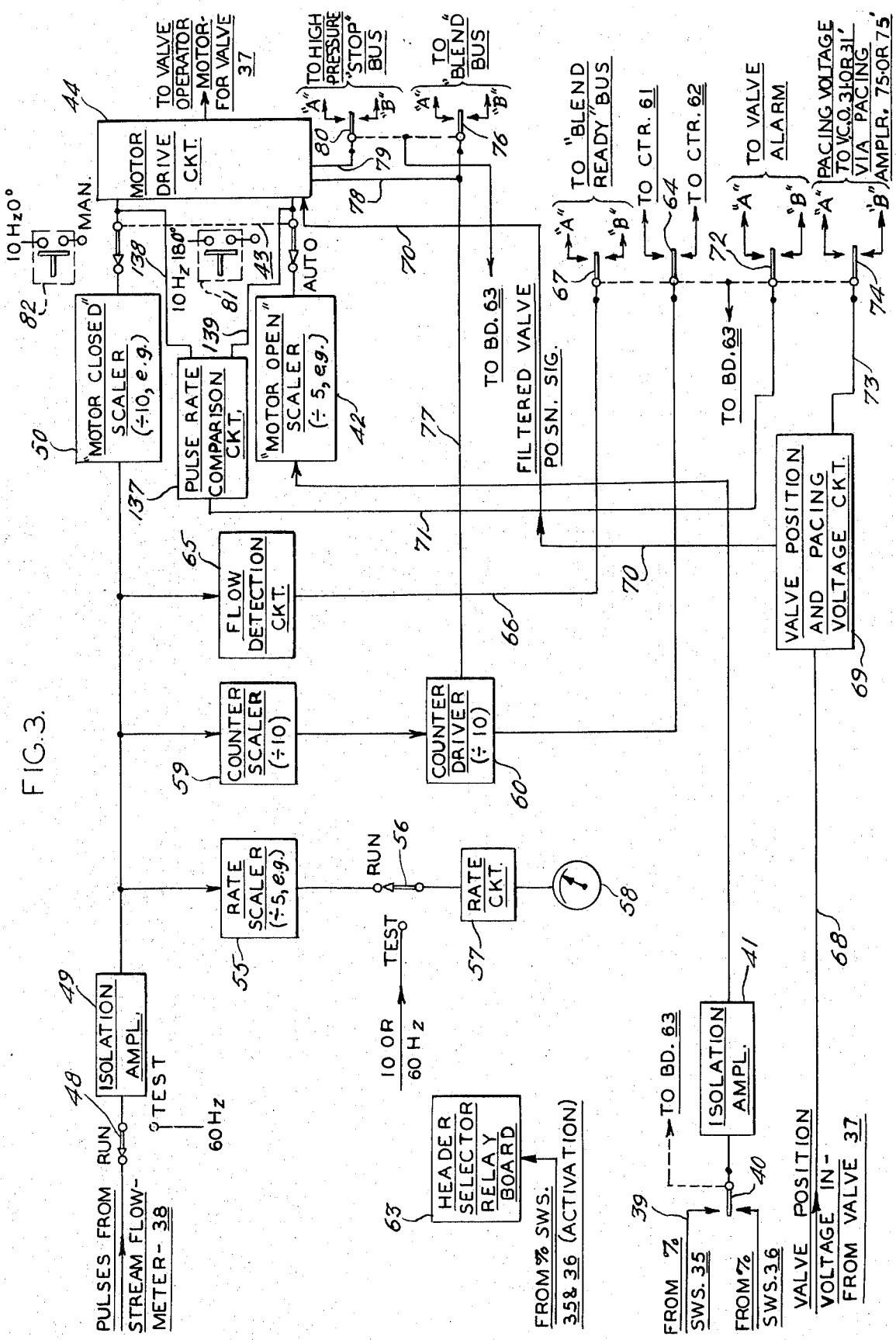
FIG. 3 is a block diagram illustrating a stream module used in the system.

Refer now to FIG. 3, which is a block diagram of the stream module 34 (for Stream X). The percent switches 35, driven by the pulse generator arrangement 32, 33, select a number of pulses corresponding to the switch setting. Thus, there appear on the output lead 39 (output side of switches 35), during each unit or basic time interval, a series of pulses the number of which is proportional to the percent set on these switches. These pulses go through a relay contact 40 (assumed closed on contact 39) to an isolation amplifier 41 and then to a "motor open" scaler (frequency divider) 42 whose division factor depends on, among other things, the characteristics of the stream flowmeter 38 and the size of the control valve 37; by way of example, this scaler may have a division factor of 5. The output of scaler 42 is utilized (when the "automatic-manual" switch 43 is in the "automatic" position illustrated) as one of the inputs for a motor drive circuit 44.

The motor drive circuit 44 provides energization for a bidirectional valve operator motor (not shown), which operates a control valve (throttle valve) 37 in the flow loop 2. In flow loop 2 (for Stream X), the liquid blending component (base oil, or additive) is supplied to the suction of a pump 45 whose discharge goes through the control valve 37 and the stream flowmeter 38 to the inlet side of the block valves 3 and 11. A controllable bypass valve 46 is inserted in a bypass line 47 which is coupled between the outlet side of the flowmeter 38 and the suction of pump 45. Valve 37 serves as a flow controlling device for the liquid blending component flowing in the flow loop 2.

The stream flowmeter 38, being in the same conduit as valve 37 but downstream from this valve, senses the flow of fluid through such valve. The flowmeter 38, like the flowmeters 5 and 13, generates pulses at a rate proportional to the fluid flow being metered. The pulses from the stream flowmeter 38 go (when the "run-test" switch 48 is in the run position illustrated) to an isolation amplifier 49, the output of which goes to a "motor closed" scaler (frequency divider) 50 whose division factor depends on, among other things, the characteristics of the flowmeter 38 and the size of the control valve 37; by way of example, this scaler may have a division factor of 10. The output of scaler 50 is utilized (when switch 43 is in the automatic position illustrated) as the other input for the motor drive circuit 44.

The desired percentages of the various components (such as that of component X, for example) can be set individually for each header. This is done by setting the appropriate percent switches (such as 35, for example) to the appropriate (non-zero) percent. The arrangement whereby this percentage is automatically controlled will now be described.

It has already been stated that the number of pulses selected from the pulse generator arrangement 32, 33 by the percent switches such as 35 are applied to amplifier 41, and then through the scaler 42 to one input of the motor drive circuit 44. The pulses produced by the stream flowmeter 38 (which are proportional to the flow in flow loop 2) are applied to amplifier 49, and then through the scaler 50 to the other input of the motor drive circuit 44.

In effect, the circuit 44 compares the pulses fed to its two inputs. If these two sets of pulses are coming into circuit 44 at the same rate, there will be no output from this circuit to the valve operator motor, and this motor will not rotate. Consequently, there will be no movement of valve 37. If, however, the rate of one set of pulses is faster than that of the other, there will be an output from circuit 44 to the valve operator motor, the sense of this output depending on which set of pulses has the faster rate. The valve operator motor will then rotate in one direction or the other, depending on the sense of the output from circuit 44. Valve 37 will then open or close, depending on the direction of motor rotation.

Summarizing the foregoing, the action of the system components just described causes the valve 37 to be brought to a position wherein the fluid flow rate through flowmeter 38 (and through the valve 37 and flow loop 2) is such that the pulse rate from the meter 38 (but scaled, at the output of scaler 50) matches exactly the pulse rate from the pulse generator arrangement 32, 33 through percent switches 35 (but scaled, at the output of scaler 42). Then, there will be no output from the circuit 44 to drive the valve operator motor so as to change the position of valve 37. At this position, then, the flow rate through the flow loop 2 will be exactly proportional to the pulse rate of the pulse generator arrangement 32, 33 multiplied by the percentage rate established by percent switches 35.

The above action is rather similar to that described in my Pat. No. 3,751,644, Aug. 7, 1973.

In FIG. 2, the frequency of the output of the voltage-controlled oscillator 31 (and thus the frequency of the output of the pulse generator arrangement 32, 33) is controlled by the "set flow" knob 30 on potentiometer 29. As the knob 30 is turned clockwise, the output frequency of oscillator 31 increases, as does also the pulse rate of the pulse generator arrangement 32, 33. This latter being at a rate of 50 pulses per gallon, the blending system is caused to blend at a higher rate (since all of the flow loop control valves connected to this system, such as valve 37, will then be opened wider). In this way, the flow rate can be set individually for each of the two headers of the blender illustrated in FIG. 1.

When switch 51 is in the run position illustrated, a rate circuit 52, to the output of which is connected a "set" rate meter 53, is connected through a rate scaler (frequency divider) 54 to the output of the voltage-controlled oscillator 31. The flow rate which has been set by the set-flow knob 30 is indicated on the set rate meter 53, which is located next to this knob 30. In order to use 60 Hz as a check point on the rate meter 53 (when switch 51 is in the "test" position), the output of the voltage-controlled oscillator 31 is scaled (in rate scaler 54) by 5, and thus the maximum frequency going into the rate circuit 52 is 100 Hz.

Refer again to FIG. 3, which comprises a block diagram of one of the stream modules, such as module 34. Pulses from the stream flowmeter 38 out of isolation amplifier 49 go to a rate scaler (frequency divider) 55 whose division factor depends on, among other things, the characteristics of the flowmeter 38 and the size of the control valve 37; by way of example, this scaler may have a division factor of 5, and is such that the pulse rate to the rate circuit board 57 (which latter is connected to scaler 55 when the run-test switch 56 is in the run position illustrated) at maximum rate is 100 pulses per second in all streams except the two dye loops or dye streams mentioned hereinabove. A flow rate meter 58 connected to the rate circuit board 57 indicates the flow rate for the stream associated with the particular stream module under consideration (for FIG. 3, this would be Stream X, associated with stream module 34).

As previously indicated in connection with scalers 42, 50, and 55, the scaling may be different for different stream modules. The scaling is preferably determined by jumpers on the connector on the back board into which the modules plug; hence, the modules are interchangeable, with no modifications to the modules themselves.

The stream flowmeter pulses out of amplifier 49 are fed also to a counter scaler 59 (having a division factor of 10) and then to a counter driver 60 (also having a division factor of 10) which is connected to drive one or the other of the two totalizing impulse counters (stream counters) 61, 62 (see FIG. 1) which are associated with the stream module 34. Thus, the stream counters (such as 61, or 62) are pulsed once for each gallon in the streams Nos. 1 through 9 (of Blender No. 1) and Nos. 21 through 27 (of Blender No. 2), since the stream flowmeters for these streams produce 100 pulses per gallon; the stream counters are pulsed once for each tenth of a gallon in streams Nos. 10 through 13 (of Blender No. 1) and Nos. 28 and 29 (of Blender No. 2), since the stream flow meters for these last-mentioned streams produce 1,000 pulses per gallon.

In the system as a whole, there is a pair of stream counters (totalizing counters, such as the pair 61, 62) adapted to be connected to each stream module (such as 34), one of each pair being associated with each respective header. Each of the stream counters 61, 62, etc. is a six-digit totalizing impulse counter, with electrical or manual reset capability.

The stream module (FIG. 3) includes a header selector relay board 63 comprising 20 normally open relays, 10 of which are associated with header A and ten of which are associated with header B (these would be headers C and D for Blender No. 2). It will be recalled that one of the two percent switches associated with each stream module and flow loop is set to zero, while the other is set to its desired percentage (in order to determine which flow control module will control the blend, as well as to determine to which header a given flow loop is connected). The signal that actuates the relays in 63 comes from the portion of the percent switch which is connected to negative when the switch is set to zero, and is disconnected from negative for all other settings. The relay contact 40 previously referred to (at the input of amplifier 41) is on the board 63.

Since there is a stream counter (for each stream) which is associated with each respective header, the output of the counter driver 60 is switched to the proper counter (61 or 62, for the stream module 34) through a relay contact 64 on the header selector relay board 63.

The stream flowmeter pulses out of amplifier 49 are fed also to a flow detection circuit 65 which develops an output at 66 which is zero with no flow and 5 volts with flow. The output 66 of the circuit board 65 goes to the "blend ready" bus for header A or to the blend-ready bus for header B through relay contact 67 on the selector relay board 63; this allows the blend-ready light for the appropriate header to be lit and the corresponding "blend start" pushbutton to be effective when depressed, if all streams which are connected to that blend-ready bus have oil flowing in them.

Information on the position of the control valve associated with each respective stream module (in the drawings, this valve would be valve 37, associated with stream module 34 and flow loop 2) is obtained from a potentiometer (not shown) mounted on the control valve 37, this potentiometer providing an output which varies from 4 to 14 volts as the valve goes from closed to open. This output voltage is fed by way of a lead 68 to the valve position and pacing voltage circuit board 69, where it is filtered and sent over an output lead 70 to the preset motor drive circuit 44 to determine a 25% valve opening. The drive circuit 44 is "preset" in that, prior to the start of a blend, this circuit energizes the valve operator motor to move the valve 37 to a 25% open position. The motor drive circuit 44 may be of the type described in my copending application, Ser. No. 462,387, filed, Apr. 27, 1974.

A pulse rate comparison circuit 137 receives one input (actual flowrate pulses) from the stream flowmeter 38, by way of items 49 and 50 and the connection 138. This circuit receives a second input (demand flow-rate pulses) from the percent switches 35 or 36, by way of items 41 and 42 and the connection 139. Circuit 137 compares the two sets of pulses applied thereto, and develops an alarm signal on lead 71 whenever the actual flowrate deviates by more than a certain amount (such as ± 6%, or ± 10%) from the demand flowrate. The pulse rate comparison circuit 137 may be of the type described in my copending application, Ser. No. 451,720, filed Mar. 15, 1974.

The alarm output lead 71 is connected through a relay contact 72 on the selector relay board 63 to the proper valve alarm contacts and light ("proper" meaning the valve alarm which is associated with header A or the valve alarm which is associated with header B, depending upon which header the stream module 34 and the flow loop 2 is connected to at the time).

The third output 73 of the circuit board 69 is a pacing voltage which causes the system (as will be described hereinafter) to automatically reduce the set flow rate when the position of any of the control valves (such as 37) exceeds 75% open. It may be noted here that the pacing voltage at 73 is developed in response to the valve position voltage fed in at 68 to the circuit board 69.

The pacing voltage goes through a relay contact 74 of the selector relay board 63 to the voltage-controlled oscillator (such as 31) in the proper flow control module (7 or 15), by way of a pacing amplifier 75 to be described.

Refer again to FIG. 2. Under normal operation of the blender, the pacing amplifier board 75 provides a 5-volt signal for the set flow potentiometer 29. If any of the control valves such as 37 exceeds approximately 75% of its opening, a pacing voltage is developed in the stream module (such as in circuit 69 of stream module 34, FIG. 3) which causes the pacing amplifier 75 to reduce the voltage applied to the set flow potentiometer 29 (which is equivalent to turning the knob 30 counter-clockwise on this potentiometer). This reduces the output frequency of oscillator 31 and thus also the pulse rate of the pulse generator arrangement 32, 33, which reduces the flow demand of the system (i.e., it causes the blending system to blend at a lower rate). The above-described action (pacing voltage action) will continue to reduce the demand until the control valve which had opened to the 75% point starts to close back, eventually finding a point at which minimum pacing is taking place consistent with a maximum flow.

If the control valve position reaches 80% open without the pacing action satisfying the system, a pacing alarm (not shown) is sounded and a "pacing" lamp (not shown) is lit. Maximum pacing occurs when the valve has reached 90% open; the flow demand of the system is then reduced to zero.

As previously stated, there are two flow control modules associated with each blender (modules 7 and 15, associated with Blender No. 1, being illustrated), one module being connected to each of the two headers. In each flow control module (such as that of FIG. 2) there is a calibration/flasher board (not shown) which is used to provide 60 Hz test signal, and in one module also a 10 Hz test signal and in the other module a 3.75 Hz signal, which is used to flash the lamps any time the system is alarmed. The determination of whether a 3.75 or a 10 Hz signal is produced is controlled by jumpers on the back of the module which determine the scaling of the 60 Hz signal input to the board.

In FIG. 2, if the test/run switches 26, 27, and 51 (which, in actual practice, are mechanically ganged together) are put in the test position, a 60 Hz square wve is introduced into both isolation amplifiers 21 and 28, and also into the "set rate" rate circuit 52. At this time, the performance of the isolation amplifier 21, the counter scaler 24, and counter driver 25 can be checked, using a laboratory standard counter; also, the two flow rate circuits 22 and 52 can be adjusted for the proper calibration points.

Prior to the blend-start pushbutton (which was previously mentioned) being depressed, the blend bus is connected to negative. Through a relay contact 76 on the selector relay board 63, and by way of a lead 77, the output of the counter driver is inhibited so that the counter connected thereto (either counter 61 or counter 62) will not count oil which is not flowing into the manifold 1 (or 10), even though oil may be flowing through the stream flowmeter 38 at this time.

A connection 78 to the preset motor drive circuit 44, which is in parallel with the counter inhibit connection 77, prevents the valve 37 from moving to any position other than its preset position. After the blend has started, the blend bus is at +5 volts and the inhibit connections 77 and 78 are disabled.

When the blend is stopped either by excessive pressure at the mixer (9 or 17) or by depressing the "blend stop" pushbutton, the motor drive is inhibited from operating (by way of a lead 79, through a relay contact 80 on the selector relay board 63), and the valve 37 remains in its last position. In this latter case, the counter driver 60 is inhibited through diodes (which are physically located on the motor drive board) and the inhibit connection 77.

The previous discussion has assumed normal operation, which means that the automatic-manual switch 43 is in the automatic position and the test-run switches 56 and 48 (which, in actual practice, are mechanically ganged together) are in the run position. If it is desired to open or close the control valves such as 37 manually, the automatic-manual switch 43 is put in the manual position, and either the open pushbutton 81 (which is connected to supply, when closed, 10 Hz at 180° to circuit 44) or the close pushbutton 82 (which is connected to supply, when closed, 10 Hz at 0° to circuit 44) is depressed until the valve moves to its desired position. Under this condition, it takes approximately 30 seconds for the valve to go from fully open to fully closed.

If it is desired to check the operation of any of the circuit board while the blender is not running, the run-test switch 48, 56 should be put in the test position. Under these conditions, a test signal is introduced at the inputs of isolation amplifier 49 and of the rate circuit 57. At this time, the rate circuit meter 58 may be calibrated, and the scaling of all scalers except the motor open scaler 42 can be checked. If the percent switches (such as 35, or 36) for the module to be checked are set at a non-zero, the motor-open scaler 42 can also be checked, as well as the operation of the percent switches.

It has previously been stated that the determination as to which header a given flow loop is connected to, is made by an appropriate setting of the percent switches associated with the corresponding stream module. Thus, to connect the flow loop 2 to a desired header (A or B), an appropriate setting of the percent switches 35 and 36 would be made. A control arrangement 83 for loop X (there being a similar control arrangement for each of the flow loops) is connected to the percent switches 35 and 36, for sensing the setting of these switches and for appropriately controlling the block valves 3 and 11. Thus, when flow loop 2 is to be connected to header A (pipe 1), the percent switches 35, 36 are set accordingly, and this causes the control arrangement 83 to open only the block valve 3; when flow loop 2 is to be connected to header B (pipe 10), the percent switches 35, 36 are set accordingly, and this causes the control arrangement 83 to open only the block valve 11.

In addition to controlling the block valves 3 and 11, the control arrangement 83 controls the bypass valve 46 (in flow loop 2).

It is desirable to sum up the totals of the percent switches setting a blend for automatic blending. In most cases, the total percent set into a blender should be 100%, and if the wrong total is set in, the individual components will be in error. Therefore, electronic counter devices operating as total percent counters are utilized in the system, the total percent counter 84 being associated with header A and the total percent counter 85 being associated with header B. Each of the counters 84 and 85 is preferably of the type disclosed in my copending application, Ser. No. 454,513, filed Mar. 25, 1974.

Each of the total percent counters requires a connection thereto from the pulse generator arrangement in the associated flow control module, and also connections thereto from all of the percent switches associated with the same flow control module. Thus, counter 84, for header A, has a connection 86 thereto from the pulse generator arrangement in flow control module 7, and has a typical connection 87 thereto from the percent switches 35 associated with module 7; connections from the other percent switches associated with module 7 to counter 84 are indicated in dotted lines in FIG. 1. Counter 85, for header B, has a connection 88 thereto from the pulse generator arrangement in flow control module 15, and has a typical connection 89 thereto from the percent switches 36 associated with module 15; connections from the other percent switches associated with module 15 to counter 85 are indicated in dotted lines in FIG. 1.

Figure 4:
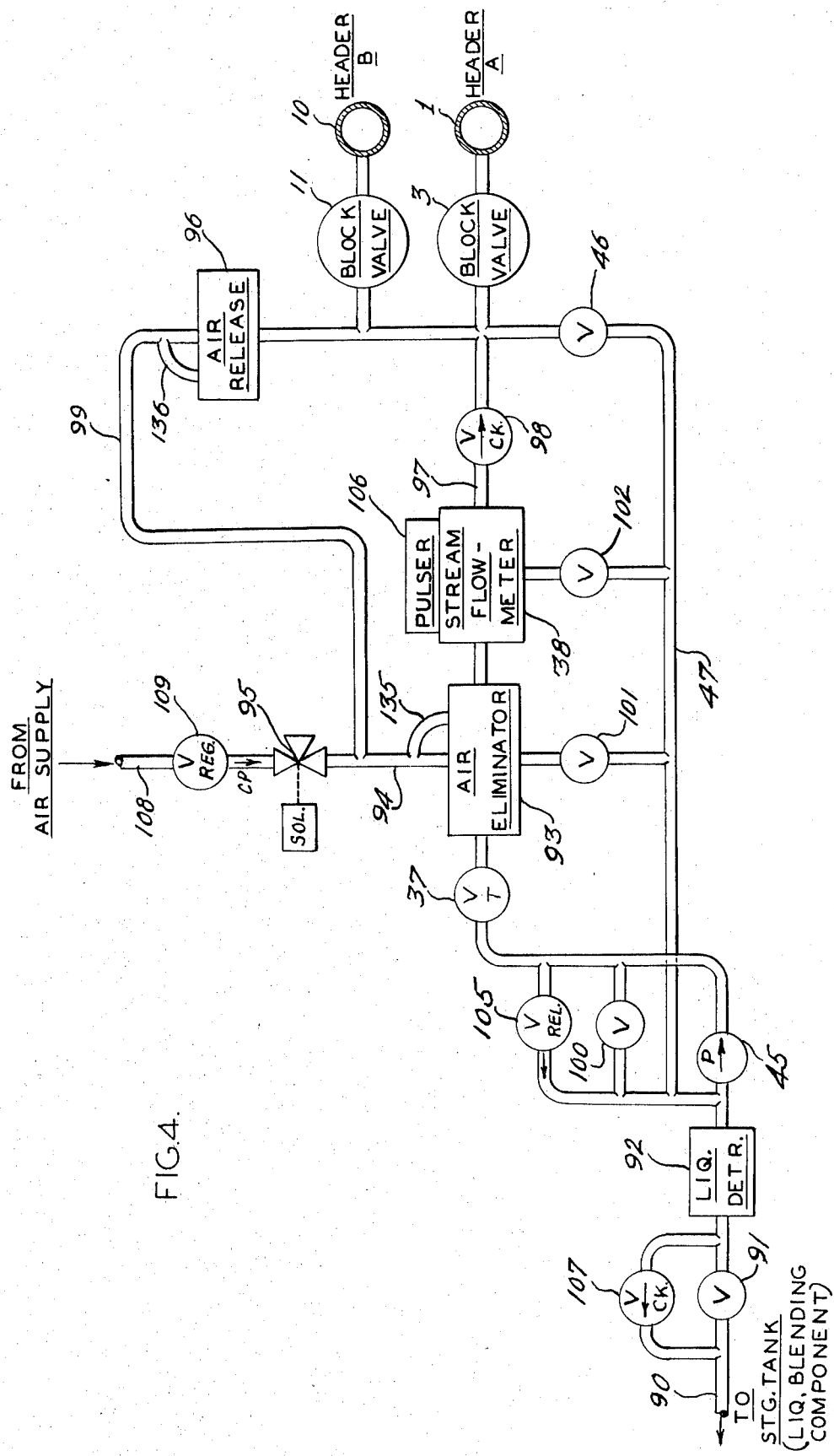
FIG. 4 is a block diagram depicting a flow loop used in the system.

Now refer to FIG. 4, which is a piping diagram of a flow loop, such as the flow loop 2 (FIG. 1). The liquid blending component (base oil or additive to be blended) is fed by means of a hose from the storage tank wherein it is stored to the input pipe 90 of the flow loop, which is connected through a manually-operated valve 91 to the inlet side of a liquid detector 92.

To start the operation of the flow loop, after the connection has been made to the loop input 90 the valve 91 is opened. When the liquid detector 92 senses oil, the motor (not shown) for the positive displacement pump 45 is energized, if the pump-start pushbutton (not shown, but on the operator's console) has been depressed. Oil then starts to circulate through the control valve 37 into the air eliminator 93. Air is expelled at the top of the air eliminator 93 (through a pipe 94 which is connected to a solenoid-operated three-way valve 95, normally open to the atmosphere) until such time as it fills with liquid and an internal ball float closes the air outlet.

When the liquid (oil) in the air eliminator 93 reaches a given level, the oil starts to flow through the stream flowmeter 38 which is coupled to the outlet side of the eliminator at such level. The remaining air is expelled through the top of the air release 96, which is coupled to the outlet side of the flowmeter 38 through a pipe 97 in which is located a check valve 98; the top of air release 96 is connected through a pipe 99 to pipe 94, and hence to atmosphere.

A motor-operated valve 100 is connected between the intake (or suction) and discharge of pump 45. Another motor-operated valve 101 is connected between the bottom of the air eliminator 93 and the bypass line 47, which extends to the suction of pump 45. A motor-operated valve 102 is connected between the bottom of the flowmeter 38 and line 47; still another motor-operated valve 46 is connected between the bottom of the air release 96 and line 47.

During the initial time referred to, the motor-operated valves 100–102 and 46 are all open, and block valves 3 and 11 (which are connected between the outlet side of flowmeter 38 and the respective manifold pipes 1 and 10) are closed. The pressure on the discharge side of the positive displacement pump 45 is held at a fixed value by the back pressure valve (pressure relief valve) 105, which is connected between the discharge and suction of this pump.

As liquid flows through the stream flowmeter 38, the pulser 106 (which forms a part thereof) is activated, sending pulses to the stream module 34 (FIG. 3) indicating that oil is flowing in the loop. As previously described, these pulses act through the flow detection circuit 65 to provide a signal to the blend-ready bus for the appropriate header.

When all of the selected flow loops have oil flowing in them, a blend-ready light is lit, and the blend-start pushbutton can be depressed. When this latter button is depressed, motor-operated valves 100, 101, 102, and 46 are all caused to close, and block valve 3 or block valve 11 opens, depending on which header was chosen. Flow of each selected blending component then takes place through its respective control valve (such as 37, controlled automatically as previously described), the respective air eliminator (such as 93), the respective stream flowmeter (such as 38), the respective check valve (such as 98), and the respective block valve (such as 3, or 11) into the header A or header B (as selected), wherein blending takes place.

At the end of the blend (e.g., when the blend-stop pushbutton is depressed), the pump motor is deenergized, and oil no longer circulates in the flow loop. At this time, motor-operated valves 100, 101, 102, and 46 are opened, and both block valves 3 and 11 are closed.

In order to minimize wasting of the base oils or additives in the flow loop, there is a blowback system associated with each flow loop which blows most of the oil in the loop back beyond the check valve 107 (which is connected across the hand-operated valve 91) toward the tank wherein the oil or additive is stored. If the material remaining in the loop at the end of the blend is to be blown back to the storage tank, it is important that the manually-operated valve 91 be closed prior to depressing the "loop and header blowback" button or the "stream blowback" button.

It will be recalled that, at the start-up of the flow loop operation, an internal ball float has closed the air outlet at the top of the air eliminator 93. Air release 96 has a similar ball float. A branch line 135, containing a check valve (not shown) which prevents oil from flowing out of the air eliminator 93, is provided to enable the introduction of air (from the air supply) into this air eliminator at a point away from the ball float in this eliminator. A branch line 136, containing a check valve (not shown) which prevents oil from flowing out of the air release 96, is provided to enable the introduction of air into this air release at a point away from the ball float in this air release.

When one of the "blowback" buttons previously mentioned is depressed, the three-way solenoid valve 95 is energized, which causes air to be introduced from the air supply into the air eliminator 93 via the line 108, the constant pressure outlet valve (regulator valve) 109, the pipe 94, and the branch line 135, and also into the air release 96 via pipe 99 and branch line 136.

Oil is now pushed by the air back toward the tank (through the various valves 100-102 and 46, now open), and continues to be pushed back until the liquid detector 92 senses air instead of oil. At this time, the solenoid 95 is deenergized (closed), and the air is released from the system to atmosphere.

Oil is now allowed to drain from the sides of the various components of the loop for a predetermined interval of time (this being a "preset drain time"). At the end of this time, the solenoid 95 is again energized, and blowback continues until the liquid detector 92 senses air again. At this second detection of air, the blowback is continued for a predetermined interval of time (this being a "preset final blow"), to attempt to push as much oil as possible back toward the storage tank.

After this last-mentioned interval of time, the three-way solenoid 95 is deenergized and the air is released from the system; the blowback cycle is then complete.

It may be noted that all of the oil pushed back toward the storage tank passes through the check valve 107 around the hand-operated valve 91, and is thus prevented from flowing back into the loop when the pressure has been released from the loop.

Now refer to FIG. 5, which is a piping diagram of the mixer section 9, in header A (pipe or manifold 1). The mixer section 17, in header B (pipe or manifold 10) is exactly similar, so only mixer section 9 will be described in detail.

Blended product flows through pipe 1 in the direction of arrow 4, as before, and the left-hand end of pipe 1 in FIG. 5 is taken at a point downstream of all flow loops, but upstream of the total flowmeter 5. For the purposes of FIG. 5, the total flowmeter 5 is shown as part of the mixer section 9, although it is illustrated separately in FIG. 1 for convenience of explanation.

An air release 110 is coupled to the manifold 1, this air release being coupled to the atmosphere by means of a conduit 111 in which is located a solenoid valve 112 which when unenergized is open. This solenoid is unenergized during the pre-blend and "blend" intervals, so that conduit 111 is open to the atmosphere during these intervals. Downstream of air release 110, a liquid detector 113, similar to liquid detector 92 previously referred to, is coupled to pipe 1. A motor-operated valve 114 is inserted in pipe 1 beyond (i.e., downstream of) detector 113, followed by a check valve 115 and then the total flowmeter 5.

Coupled to the outlet side of flowmeter 5 is a mixer 116, powered by a motor 117, through which the blended product flows on its way to the final output portion 118 of pipe 1, a final check valve 119 being inserted in the output portion 118 of the manifold or pipe 1. A motor-operated valve 120 is inserted in a line which extends from the bottom of the flowmeter 5 and the bottom of mixer 116 to the output line portion 118. A drain line 121 is coupled from the output line portion 118 to a drain, and in line 121 there is inserted a motor-operated valve 122. Beyond check valve 119, a drain line 123 is coupled from the output line portion 118 to the drain, and in line 123 there is inserted a motor-operated valve 124. Between detector 113 and valve 114, a drain line 125 is coupled from the manifold pipe 1 to the drain, and in this latter line there is inserted a motor-operated valve 126.

A liquid detector 127, similar to detector 113, is coupled to the output line portion 118, adjacent to but upstream of check valve 119.

When oil is introduced into the manifolds (such as 1) from the flow loops (such as 2), which is to say at a blend-start instant of time, valves 114, 120, 122, 124, and 126 are all closed (valves 120, 122, 124, and 126 having been open during the pre-blend interval, prior to this instant). The air in the manifold 1 is then released out the air release 110 by way of conduit 111 to atmosphere (since valve 112 is open at this time). When detector 113 senses oil, valve 114 opens and allows oil to go through the total flowmeter 5 to the mixer 116. Valve 114 is of the slow-opening type, such that it takes about four seconds to open; this prevents the oil from hitting the flowmeter 5 as a slug.

When detector 127 senses oil, the electric mixer 116 is energized, by energization of its motor 117. As previously stated, following detector 127 the oil (blended product) goes through check valve 119 out to a tank or other destination through a hose and a suitable line.

When the blend is complete, the mixer 116 stops operating, and the blended oil remains in the manifold 1, and particularly in the mixer section 9, shown in FIG. 5. In order to ensure that all of the material which has been blended is delivered to its destination, there is, in the system being described herein, an air blowing system which forces the remaining blended oil out of the header up to a point in the line where a pigging system can push the oil the remainder of the way.

A line 128 is connected through a solenoid valve 129 (normally closed, opened when the solenoid is energized) and a check valve 130 to introduce air from the air supply into the upstream end of the pipe 1. When the loops-and-header-blowback pushbutton or the "header only blowback" pushbutton is depressed, valve 120 is opened; thus, at this time, valves 114 and 120 are open and valves 122, 124, and 126 are closed. Also, at this time (in response to the pushbutton operation) solenoid valve 129 is energized, opening this valve, and solenoid valve 112 is also energized, closing this latter valve.

As a result of the foregoing, air is then introduced into the manifold 1 through valve 129; this air forces the oil out of the manifold, through the flowmeter 5 and the mixer 116, into and through the pipe output portion 118.

The mixer 116 (which was reenergized when the blowback started) continues to operate until detector 113 senses air. When this occurs, solenoid valves 129 and 112 are deenergized (opening the latter), and the air in the manifold is released, through 110, 111, 112.

A branch line 131 is connected through a solenoid valve 132 (normally closed, opened when the solenoid is energized) and a check valve 133 to introduce from the air supply into the mixer 116.

When detector 113 senses air, solenoid valve 132 is energized, opening this valve; thus, at this time, air is introduced into the mixer 116, which pushes the oil beyond the mixer out toward its destination.

When detector 127 senses air, the blowing into the mixer continues for a predetermined period of time following such first sensing of air.

If before this last-mentioned period of time has expired, oil has drained from the manifold into detector 113, solenoid valve 132 is deenergized and air is no longer introduced at the mixer 116; however, in this case solenoid valves 129 and 112 are energized (valve 129 being opened and valve 112 being closed), resulting in air being again introduced into the manifold 1 and pushing oil through the flowmeter 5 and mixer 116 until detector 113 again senses air. The introduction of air to the manifold 1 and to the mixer 116 is thus alternated until detector 127 senses air (absent any further sensing of oil by detector 113) for the entire predetermined period of time (while the oil is pushed to the point at which pigging can start).

After this predetermined period of time, valves 120, 122, 124, and 126 are opened and valve 114 is closed, and any oil remaining in the system is allowed to drain out (through the drain valves 122, 124, and 126). Also, the air pressure of the system is released (solenoid valve 112 being open because of the deenergization of its solenoid).

A pressure tap conduit 134 couples a pressure switch 103 and a pressure gauge 104 to the line portion 118, downstream of the mixer 116. The pressure switch 103 is provided so that the blending can be shut down if the pressure rises above a preset value (e.g., due to a valve being closed off against the blended material).

Due to the method of air release utilized, both at the beginning of a blend and during blowback, no air flows through the flowmeter 5; thus, the flowmeter records only oil, and there is no need for an electrical interlock to stop the total counters 19, 20 during the initial blending, or during blowback.

The invention claimed is:

1. Stream-type liquid blending apparatus comprising a pair of independent blending headers, a plurality of flow loops, means for circulating a respective liquid blending component through each of said loops, separate controllable means coupled to each of said loops for causing the corresponding blending component to be fed into either of said headers, and manually-operable means for selectively operating the controllable means of each loop, thereby to cause the corresponding blending component to be fed into a selected one of the two headers.

2. Apparatus of claim 1, wherein the manually-operable means is also operable to select the percentage of the blending component fed into the selected header.

3. Apparatus according to claim 1, wherein the manually-operable means comprises a pair of switches for each loop, one switch of each set of paired switches being associated with one of said headers and the other switch of each set of paired switches being associated with the other of said headers.

4. Apparatus of claim 3, wherein one switch of each set of paired switches is connected to receive control pulses for said one header, and the other switch of each set of paired switches is connected to receive control pulses for said other header.

5. Apparatus set forth in claim 4, wherein each of the switches comprises percent switches manually settable to pass a selected percentage of the control pulses applied thereto.

6. Apparatus according to claim 1, wherein the controllable means comprises a pair of block valves for each of said loops, coupled between the corresponding loop and respective ones of the two headers.

7. Apparatus of claim 6, wherein the manually-operable means is arranged for selective operation of said block valves.

8. Apparatus of claim 7, wherein the manually-operable means is also operable to select the percentage of the blending component fed into the selected header.

9. Apparatus set forth in claim 6, wherein the manually-operable means comprises a pair of switches for each loop, one switch of each set of paired switches being associated with one of said headers and the other switch of each set of paired switches being associated with the other of said headers.

10. Apparatus of claim 9, wherein one switch of each set of paired switches is connected to receive control pulses for said one header, and the other switch of each set of paired switches is connected to receive control pulses for said other header.

* * * * *